United States Patent [19]

Lefrancois et al.

[11] 3,856,916

[45] Dec. 24, 1974

[54] PROCESS FOR PREPARING CHROMIUM SULPHATE FROM RESIDUAL SOLUTIONS CONTAINING HEXAVALENT CHROMIUM COMPOUNDS

[75] Inventors: Robert Lefrancois; Jacques Denoyers, both of Paris; Michel Gabriel, Casablanca, all of France

[73] Assignee: Societe Anonyme Produits Chimiques Ugine Kuhlmann, Paris, France

[22] Filed: Apr. 12, 1973

[21] Appl. No.: 350,503

[52] U.S. Cl.................. 423/54, 210/37, 210/30, 210/32, 423/544
[51] Int. Cl............................................. C01g 37/08
[58] Field of Search................ 423/54, 544, 658.5; 210/37, 38, 30–32

[56] References Cited
UNITED STATES PATENTS 3,306,859  2/1967  Sloan et al. .................... 210/37 X
3,417,016  12/1968  Yagishita ......................... 210/37 X
3,664,950  5/1972  Sansceno et al. ................ 210/37 X

FOREIGN PATENTS OR APPLICATIONS 45-17782  6/1970  Japan................................. 423/54

Primary Examiner—Herbert T. Carter
Attorney, Agent, or Firm—Hammond & Littell

[57] ABSTRACT

A process for preparing chromium sulphate from residual solutions containing hexavalent chromium compounds, wherein, firstly, the hexavalent chromium from the residual solution to be treated is extracted and fixed, by known means notably by contacting the said solution either with an ion exchange resin or with a water-insoluble organic solvent, then the hexavalent chromium thus fixed by the resin or organic solvent is reextracted.

Said reextraction according to the improved process of the invention, is carried out with a solution of sulphur dioxide in the presence of sulphuric acid to directly recover a chromium sulphate solution.

6 Claims, 2 Drawing Figures

PROCESS FOR PREPARING CHROMIUM SULPHATE FROM RESIDUAL SOLUTIONS CONTAINING HEXAVALENT CHROMIUM COMPOUNDS

The invention relates to the preparation of chromium sulphate from residual solutions containing hexavalent chromium compounds.

The extraction of chromium from its ores by wet method processes for the preparation of various compounds such as chromium sulphate or basic chromium sulphate, chromic acid, chromates or bichromates, always results in residual solutions containing large amounts of chromium derivatives, and notably hexavalent chromium derivatives. Similarly, electroplating installations dispose of large amounts of solutions which have become unusable but which still have high chromium contents.

All said residual solutions have the characteristic of being charged with all sorts of impurities, and notably metal impurities, which prevent their being reused directly. For many years, manufacturers preferred to discharge these solutions into rivers rather than purify them or recover the chromium contained in these solutions. Yet chromium compounds, and especially hexavalent chromium compounds, are redoubtable pollutants as in addition to the toxicity of chromium it has a high oxidizing capacity. Regulations now in force limit the concentration of hexavalent chromium in liquid effluents discharged into watercourses to a level of 0.1 to 1 mg per liter, according to the country, whereas up to 2 mg per liter of trivalent chromium is tolerated.

Various processes for the treatment of liquid effluents containing hexavalent chromium have already been suggested or put into effect. It is thus possible to reduce hexavalent chromium and precipitate chromic hydroxide $Cr(OH)_3$. Many reducing agents are known, one of the least costly being sulphur dioxide. Precipitation involves neutralization of the solution with a cheap reagent such as lime. This process has two drawbacks. Firstly, the $Cr(OH)_3$ precipitate is difficult to filter; it is very gelatinous and needs to be treated with a filter press technique. In addition as it is very impure, it cannot be reused economically: it then forms a solid waste, the disposal of which constitutes a further risk of pollution.

Another process consists in taking advantage of the properties of ion exchange resins to extract hexavalent chromium from liquid effluents. As said chromium is in the form of anions, it can be extracted selectively with a basic anionic exchange resin. Elution is effected by washing the resin with a soda solution which takes up sufficient pure sodium chromate to be reused in the preparation of various compounds.

When the preparation of chromium sulphate is envisaged, such a process has the drawback of resulting in a considerable consumption of soda and sulphuric acid, as the sodium chromate solution must be neutralized with sulphuric acid then, after reduction, be reacidified with the same acid.

In this connection, an elution-reduction process for an anionic exchange resin on which hexavalent chromium had previously been fixed has also been described, a process according to which a sulphuric solution of sodium bisulfite $NaHSO_3$ is used. According to this process, an anion is therefore adsorbed on an ion exchange resin and the said resin is treated with a chemical agent capable of converting the anion into a cation, the said cation then being desorbed from the resin, which is therefore regenerated.

It should be noted that large amounts of reagents necessarily have to be used in this process, as will be seen in cases (1) for the production of a basic chromium sulphate solution (basicity 33) and (2), for the production of a neutral chromium sulphate solution.

1. In the case where it is desired to obtain a basic chromium sulphate, of the formula

generally with a basicity of 33° Schorlemmer, notably for use in tanning, the following reactions should be effected, wherein R is the anionic exchange resin on which the hexavalent chromium has been fixed:

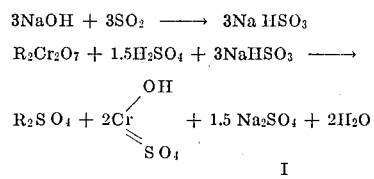

Therefore, for 2 moles $CrOHSO_4$, 3 moles NaOH, 3 moles $SO_2$ and 1.5 mole $H_2SO_4$ are required.

2. In the case where neutral chromium sulphate $Cr_2(SO_4)_3$ is desired, it is necessary to conduct the following reactions to obtain said compound:

$3\ NaOH + 3SO_2 \rightarrow 3\ NaHSO_3$

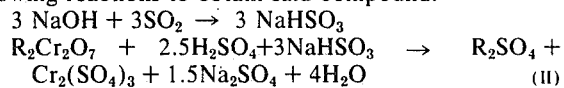

It follows that, for 1 mole $Cr_2(SO_4)_3$, 3 moles NaOH, 3 moles $SO_2$ and 2.5 moles $H_2SO_4$ should be used. It is also known to extract hexavalent chromium compounds dissolved in an aqueous solution by a water-insoluble organic liquid, but the application of this practice to the treatment of industrial waste waters has not been possible up to now owing to the lack of economical processes for reextracting hexavalent chromium from the organic solution. In order for such a process to be economical it should directly provide a commercial chromium compound, that is to say, salts such as sodium bichromate. Then again, the solvent used to effect extraction should not only possess the usual properties required for this type of treatment but it should also have an excellent resistance to oxidizing agents, even in a highly acid medium. Indeed, this situation is frequently met with, as the waste solutions obtained from electroplating installations or residual solutions from the production of chromic acid are highly sulphuric solutions of chromic acid.

The object of the present invention is a process which avoids stream pollution caused by solutions containing hexavalent chromium compounds, with the accompanying production of chromium sulphate. The process according to the invention is based on the recovery of hexavalent chromium from solutions containing the same, which hexavalent chromium has previously been fixed on ion exchange resins or extracted with a water-insoluble organic solvent, by more economical means than those previously applied or envisaged, the trivalent chromium sulphate being obtained directly, and without excessive consumption of reagent, from the hexavalent chromium ions thus fixed or extracted.

The process according to the invention consists in that hexavalent chromium in the residual solution is extracted and fixed by known means, notably by contacting the said solution either with an ion exchange resin or with a water-insoluble organic solvent; then the hexavalent chromium thus fixed by the resin or organic solvent is reextracted by contacting the fixing agent with an aqueous solution, and it is characterized in that said reextraction is effected by the use of an aqueous solution of sulphur dioxide in the presence of sulphuric acid to directly recover a chromium sulphate solution.

The residual solutions to which the invention is applied can have very varied compositions. Notably, apart from hexavalent chromium compositions, they may contain a large number of metal impurities, such as alkaline and alkaline-earth metals, iron and metals of the family of iron, aluminium, magnesium, zinc, titanium, etc. They may also contain trivalent chromium. The exact compositions vary with the origin or said solutions. There should notably be mentioned the solutions discarded by installations treating chromium ore, or by electroplating installations.

The concentration of hexavalent chromium compounds in said solutions can vary in a large range. It is normally in the range of 0.01 to 200 g/l, expressed as $CrO_3$, and preferably between 0.1 and 30 g/l.

To obtain satisfactory operation of the process in the case where the hexavalent chromium in the solution to be treated is fixed with an ion exchange resin, the pH of the residual solutions should be in the range of 0 to 6 and preferably from 2 to 3. When they contain a large amount of free acid which is very frequently the case, they should therefore, as has been said, be previously neutralized until their pH is within the above mentioned limits, said neutralization can be carried out with a cheap base such as lime. Conversely, when extraction of the hexavalent chromium from the initial residual solution is effected by liquid-liquid contact of the solution with a water-insoluble organic solvent, said initial solution can be used as it is, without preliminary neutralization, even if it is highly acid. This is an important advantage of said second method with respect to the first as, when neutralization has to be effected, by means of lime, for example, as was mentioned hereinabove, the calcium sulphate precipitated must be separated by filtration, with the difficulties this involves, and washed to deplete it of the initial solution and the chromium compounds with which it may be impregnated.

Any basic anionic exchange resin can be used to extract hexavalent chromium from the initial solution by means of an ion exchange resin; however, it is preferred to use weakly basic macroreticulated anionic exchange resins which have high fixing capacities and good oxidation stability. In this respect may be mentioned, for example, the resin commercialy available under the Trade name "Amberlite IRA 93," capable of fixing up to 160g of hexavalent chromium compounds expressed as $CrO_3$ per liter of resin, by reducing the concentration of hexavalent chromium compounds expressed as $CrO_3$ per liter of treated solution to less than 1 mg per liter at the end of the treatment. These results are only obtained if the resin is in the sulphate form, that is to say, if it is previously saturated with $SO_4^{--}$ ions, which is realized by passing a sulphuric acid solution at about 5%. Said saturation need only be done once, after a new resin feed is put in place, the regenerating elution according to the process of the invention necessarily restoring the resin to this form.

When contacting with a water-insoluble organic solvent is used to extract the hexavalent chromium, said solvent, in addition to the qualities required by the extraction itself, that is to say, a high coefficient of division and an ability to separate out easily from the aqueous solution, must have an excellent oxidation stability even in a strongly acid medium. These requirements greatly reduce the choice of suitable solvents. Among these, long chain amines or certain alkylphosphates are preferably used. As long chain amines may be mentioned the secondary amines, such as those commercially available under the Trade name "Amberlite LA2" of Rohm & Haas, tertiary amines such as those commercially available under the Trade name "Alamine 336" of General Mills quaternary ammonium derivatives such as the product commercially available under the Trade name of "Aliquat 336" of the latter company. These amines are not pure products, but mixtures of several amines. The important point is the total number of carbon atoms in the alkyl chains; in order to have satisfactory water-insoluble characteristics, it should not be less than 18. The amines are not used alone, but in solution in an organic diluent such as xylene or higher molecular weight aromatic hydrocarbons, such as the product commercially available under the name of "Solvesso." The amine concentration in the solution may be in the range of 0.1 to 0.5 mole per liter and preferably between 0.1 and 0.2 mole/1. Tributylphosphate, which has a remarkable oxidation stability, is preferably used as the alkylphosphate. It can be used alone or in solution in a hydrocarbon but it is more advantageous to use it alone. To recover the hexavalent chromium, fixed by the resin or the organic solvent, as trivalent chromium sulphate, a sulphuric solution is used containing a reducing agent capable of reducing the chromium to a valency of three. The trivalent chromium is then in the cation state and it is immediately separated from the anionic exchange resin to pass into the elution solution; this solution should be acid to maintain the reduced chromium in the dissolved state. If extraction of the hexavalent chromium has been effected with an organic solvent, the trivalent chromium resulting from conversion with the reducing agent passes immediately into the aqueous solution, since it is practically insoluble in the organic solvent.

Many reducing agents are suitable but, if the process is to be economically advantageous, they must be cheap and introduce no undesirable element which would subsequently have to be removed. Methanol, residues from the manufacture of sugar (molasses and syrups), and preferably sulphur dioxide or aqueous solutions of sulphur dioxide are particularly suitable. The acid used to acidify the elution solution is obviously sulphuric acid, when the preparation of chromium sulphate is desired. The solution is therefore preferably an aqueous sulphuric solution of sulphur dioxide; the latter oxidizes into sulphuric acid during reduction of the hexavalent chromium compound.

In the case of the elution of an ion exchange resin, the initial level of sulphuric acid in the solution is preferably in the range of 2 to 20 g/l $H_2SO_4$; its $SO_2$ concentration represents an excess of 2 to 15 based on the stoichiometric amount which corresponds to 3 moles of $SO_2$ for 1 mole $H_2SO_4$ After regeneration of the resin it is saturated with $SO_4^{--}$ ions and is ready for the treatment of new batches of residual solutions.

After saturation and each regeneration the resin charges are washed with demineralized water to remove the solution with which they are impregnated. After the saturation phase the washing solutions are combined with the residual solutions to be purified. After the regeneration phase, the washing solutions are combined with the elution solutions for their subsequent use.

When chromium is to be reextracted from an organic solution in the trivalent state only the conversion of sulphur dioxide into sulphuric acid by oxidation can be relied on to ensure the necessary presence of the latter compound in the aqueous solution, and it is then possible to operate by adding water to the organic solution, and injecting the sulphur dioxide into the stirred mixture, the sulphur dioxide thus forming the desired aqueous solution of sulphur dioxide in sulphuric acid in situ. However, it is naturally possible to use a preformed sulphuric acid starting solution wherein the sulphur dioxide is dissolved. The concentration of the sulphuric acid solution can be as high as 1 mole per liter, corresponding to a value of up to 25%, but it is, of course, possible to use more dilute solutions.

The embodiment of the invention by the two possible processes is described hereinbelow with reference to the appended drawings in which.

Figure 1:
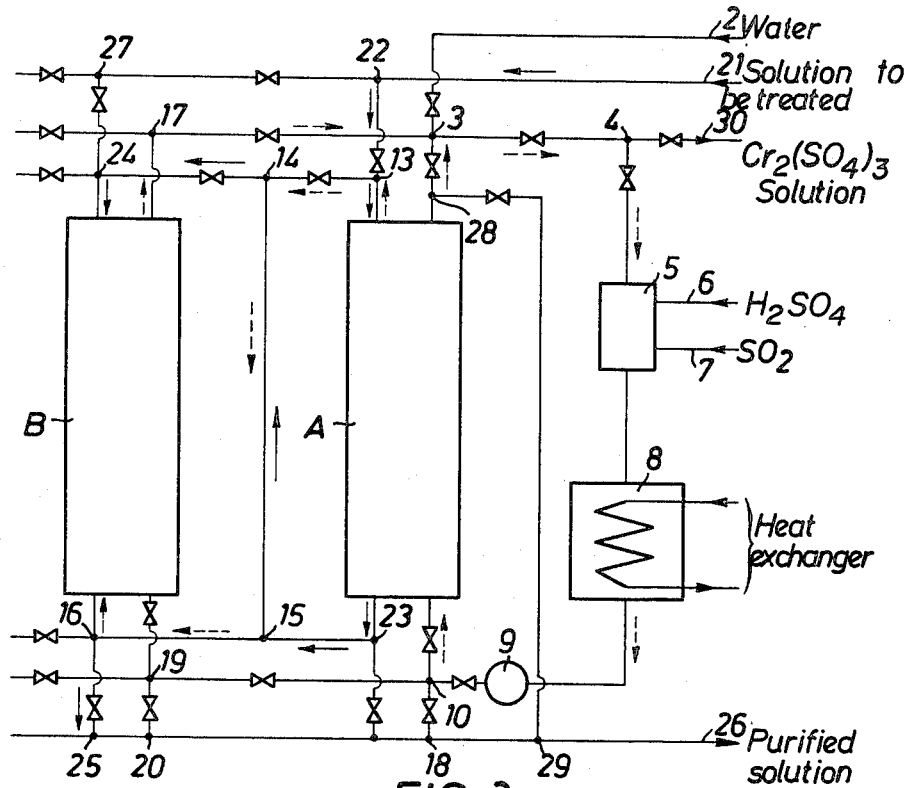
FIG. 1 is a diagram of an installation for the treatment of a residual solution containing hexavalent chromium by passage over an ion exchange resin.

In the example of FIG. 1, two columns A and B are used, filled at the start to about half their height with a slightly basic anionic exchange resin in the OH form as supplied by the manufacturer. The valves positioned on the various conduits of the installation being placed in the positions providing the circuit 2, 3, 4, 5, 8, 9, 10 A. The required amount of water is introduced into the circuit for treatment of the resin to pass it into the sulphate state. The valves are then arranged to form the closed circuit 3, 4, 5, 8, 9, 10, A, 13, 14, 15, 16, B, 17, 3 (shown by the arrows drawn with dashed lines), the desired amount of sulphuric acid being introduced at 6, and circulated through said closed circuit by means of pump 9. Said treatment is effected with a slow flow rate of solution, taking care to allow the layer of resin to expand freely. Dilation of the bed is in fact considerable, in the range of 20 to 40% according to the resins. This treatment can continue for several hours. Once said treatment has ended, columns A and B are purged by pipes 10-18 and 19-20.

The valves controlling the circulation in the various conduits are then positioned in a manner suited to form circuit 21, 22, 13, A, 23, 15, 14, 24, B, 16, 26 (arrows drawn with continuous lines), and the residual solution to be treated, previously adjusted to the required pH, is passed through conduit 21. Therefore, the solution first circulates through column A then downwardly through column B, but a circulation in the opposite direction is also acceptable. The flow rate of the solution corresponds to a velocity of 2 to 20 m per hour, in the columns assumed to be empty. The purified residual solution is withdrawn through conduit 26. When column A is saturated, that is to say when a sample of the solution withdrawn therefrom, and taken at point 13, has a concentration similar to that of the feed solution, it should be regenerated. By means of the appropriate valves, circuit 21, 27, 24, B, 16, 25, 26 (arrows drawn with continuous lines) is then established on the one hand, the feed solution being thus directly passed into column B, and column A being cut off and, on the other hand, circuit 2, 3, 4, 5, 8, 9, 10, A, 28, 29 is established. Demineralized water is then passed in at 2 and column A is thus washed by a flow of water circulating in the same direction as the solution to be treated, the volume of water used representing from two to 12 times the value of the solution in the column. The washing solution is withdrawn at 18 and mixed with the solution to be treated, and the mixture is passed to the top of column B, a derivation (not shown) being provided for this purpose between points 18 and 21.

Once this washing has been carried out, and to carry out the regeneration of the resin contained in column A, a regeneration which is accompanied by the production of chromium sulphate, the valves related to column A are positioned respectively in such a way as to reestablish circuit 2, 3, 4, 5, 8, 9, 10, A and a sufficient amount of demineralized water is introduced at 2 to form the regeneration solution. The inlet pipe 2 is then isolated to establish the closed circuit 3, 4, 5, 8, 9, 10, A 3 (arrows drawn with dashed lines) in which there is circulated, by means of pump 9, the regeneration solution formed by introducing of the sulphuric acid arriving through conduit 6 and $SO_2$ gas arriving through pipe 7 into the stream of water as it passes through mixer 9; said circulation occuring upwardly in column A, where the regeneration solution converts the hexavalent chromium into trivalent chromium which reacts with sulphuric acid to form chromium sulphate in solution. The reduction of hexavalent chromium into trivalent chromium is accompanied by a release of heat, any excessive rise in temperature which would risk damaging the resin and decrease, or even destroy its exchange capacity should be avoided. This exothermicity limits the concentration of the elution solution to low values. It is in order not to have to subsequently use dilute solutions of chromium sulphate that regeneration of the column is carried out by closed circuit circulation of the eluent solution. After having passed from column A by way 3, 4, the latter receives at 5 a concentrated solution of sulphuric acid and $SO_2$ which dissolves, this supply of $H_2SO_4$ and $SO_2$ then being continued as it is required to compensate losses due to the reaction. It then passes into a heat exchanger 8 which lowers its temperature to about 20° C before returning to column A. Regeneration of the column is finished when a slight excess of $SO_2$ appears at 3. Circuit 5, 8 etc. is then isolated to withdraw at 30 the neutral concentrated chromium sulphate solution which has been formed. It should be noted that if, after having regenerated one column of resin, the concentration of chromium sulphate in the elution solution is still too weak, this same solution can be reused to regenerate a second column, or other columns, until it has reached the desired concentration.

After, regeneration, the resin is still impregnated with a chromium sulphate solution which may be highly concentrated. A further washing is therefore carried out with a flow of demineralized water under the same conditions as before. The washing solution is then mixed with the elution solution.

The figure shows an installation with only two columns, but it is understood that it could comprise three or more, as is shown by the beginnings of pipes on the left of FIG. 1. According to the flow rates of the solution to be treated, each column can be replaced by a group of two or three columns connected in parallel. While one column or group of columns is being regenerated the other two are undergoing saturation. Such combinations are now very well known. They do not form part of the present invention.

Figure 2:
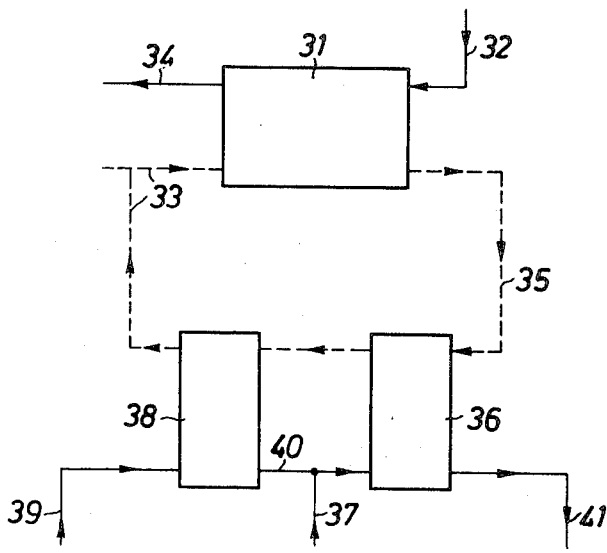
FIG. 2 is a similar diagram relating to the treatment of such a solution with an organic solvent.

The installation shown in FIG. 2 is adapted to a case where extraction of hexavalent chromium from the solution to be treated is carried out by liquid-liquid contact with a water-insoluble organic solvent, said solvent then being treated with a sulphuric acid solution of a reducing agent, namely sulphur dioxide.

According to what is shown in this figure, in a liquid-liquid extraction apparatus 31 of the mixer-decanter type comprising 4 levels, there is circulated countercurrently on the one hand the residual solution containing hexavalent chromium compounds from pipe 32, and on the other hand, the organic solvent supplied through pipe 33. The relative flow rate of the two solutions depends on the concentration of hexavalent chromium compounds in the residual solution; the flow rate of organic solvent being all the higher, based on that of the residual solution; the higher the hexavalent chromium concentration in the latter. Extraction is very rapid and the residual solution and solvent remain in contact for a short period of time. This situation is favorable to good conservation of the solvent. The extraction rate of hexavalent chromium, expressed by the percentage of chromium having passed into the organic solvent based on the chromium present in the residual solution is higher than 95% and may be as high as 99.7 to 99.9%. The concentration of hexavalent chromium in the organic solvent is in the range of 2 to 50 g and generally between 5 and 30g of chromium per liter. The exhausted residual solution is withdrawn through pipe 34. Its concentration in hexavalent chromium compounds is lower than 150 mg/l. It can be evacuated into the sewers after neutralization or, if it has a high sulphuric acid content, used in another manufacturing process not requiring a pure acid.

The organic solvent containing hexavalent chromium is passed through pipe 35 into a mixer-decanter 36, identical to mixer 31 but only comprising a single stage. In this apparatus, an organic solvent is circulated countercurrently to an aqueous sulphuric acid solution of sulphur dioxide formed as described hereinafter. The latter reduces the hexavalent chromium into trivalent chromium. As the trivalent chromium is practically insoluble in the organic solvent it repasses immediately into the aqueous solution providing a neutral chromium sulphate solution which is recovered at 41.

The solvent discharged from apparatus 36 still contains small amounts of hexavalent chromium. It is washed, in a mixer-decanter 38 identical to apparatus 36 and also only comprising one stage, by a flow of water arriving through conduit 39. The temperature in the mixer-decanter 38 lies in the range of 50° to 70° C and preferably between 60°-65° C. The aqueous solution resulting from said washing leaves apparatus 38 through pipes 40 which passes it to apparatus 36 and within which it receives, through pipe 37, a current of gaseous sulphur dioxide which dissolves therein. Oxidation of the sulphur dioxide by the hexavalent chromium in apparatus 36 results in the formation of the necessary amount of sulphuric acid.

Starting with the chromium sulphate solutions obtained according to the invention, various hydrated chromium sulphates can be crystallized. Basic chromium sulphates or, again, a chrome alum of excellent quality can also be prepared by alkalization.

In comparison with the above-mentioned reaction equations it is seen that to produce basic chromium sulphate having a basicity of 33° Schorlemmer by the process of the invention the following reactions are effected, wherein R is the anionic resin to which hexavalent chromium has been fixed:

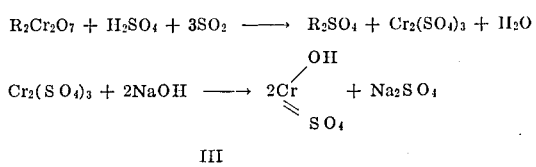

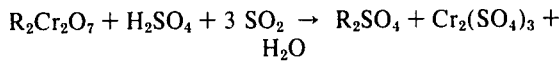

III

Compared with the system of reaction equations I it is therefore seen that the amount of soda and sulphuric acid to be used are both lower by one third, as according to the invention only 2 moles NaOH and 1 mole $H_2SO_4$ are required for 2 moles $CrOHSO_4$.

Similarly, for the production of neutral chromium sulphate by the process according to the invention the following reaction is effected:

$$R_2Cr_2O_7 + H_2SO_4 + 3\ SO_2 \rightarrow R_2SO_4 + Cr_2(SO_4)_3 + H_2O$$

Compared with the system of reaction equations II it is seen that this time the amount of soda to be used is lower by 100% and the amount of $H_2SO_4$ to be used by 60%, as soda does not have to be used and only 1 mole $H_2SO_4$ is needed per mole $Cr_2(SO_4)_3$.

The numbered examples given hereinafter illustrate the invention; they are in no way limitative in nature.

EXAMPLE 1

The extraction of hexavalent chromium on resin

In a glass tube with an inner diameter of 25 mm containing 400 ml of a slightly basic macroreticulated anionic exchange resin, with tertiary amine function groups ("Minoc's Amberlite IRA 93)" in the OH form, a sulphuric acid solution at a rate of 52 g $H_2SO_4$ per liter is passed upwardly and at a flow rate of 10 $h^{-1}$ (volume of solution for a volume unit of resin and per hour) so that the resin is brought into its ion containing form or into its sulphate form.

A solution containing 7 g/l of chromium in the hexavalent state and having a pH or 2.5 is then passed through the tube per descendum and at the same rate. When the column is saturated, 78 g of chromium in the 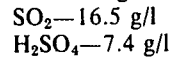 state is fixed per liter of resin.

Washing with demineralized water is then carried out followed by elution of the resin using a solution having the following composition:

$SO_2$—16.5 g/l
$H_2SO_4$—7.4 g/l

This eluting solution is circulated upwardly at a rate of 10 $h^{-1}$. The temperature within the column, which was initially 20° C, then rises to 30°-35° C. After passing 4 liters of said eluting solution the resin is washed again with a solution of demineralized water.

A solution of chromium sulphate containing no hexavalent chromium and having a Cr content of 6g/l is obtained, with a yield of about 95%. The resin is repassed in the sulphate form and can be used again directly to treat a further amount of hexavalent chromium solution.

It is obvious that said solution could be recharged with $SO_2$ after cooling and be used to elute a new charge of resin saturated with hexavalent chromium. Recycling carried out continuously using a cooling system with an exchanger to carry off the heat of oxidation, would enable to produce a concentrated chromium sulphate solution.

EXAMPLE 2

The extraction of hexavalent chromium on resin

In a glass column identical to that of example 1 and containing 400 ml of the same resin, 1,300 ml of a $H_2SO_4$ solution at 52 g/l is circulated in a closed circuit for 5 hours and at a rate of 3.3 $h^{-1}$ so as to bring the resin into its sulphate form. The volume of the resin then increases to 552 ml, corresponding to an increase in volume of 38%.

An effluent solution obtained from a workshop manufacturing chromium derivatives is then passed downwardly through said column, at a flow rate of 8.3 $h^{-1}$, this effluent solution has the following characteristics

| | | |
|---|---|---|
| $Cr^{6+}$ content (expressed in $CrO_3$) | 14.7 | g/l |
| $Cr^{3+}$ content | 0 | |
| $SO_4$ content | 4.6 | |
| pH | 2.50 | |

The solution discharged from said column is also passed downwardly through a second column identical to the first and containing the same amount of resin also in the sulphate form. After 140 minutes, 7,800 ml of the solution has passed and the solution discharged from the first column contains 13.95 g/l $CrO_3$, which indicates that it is practically saturated.

The first column then containing 156.5 g $CrO_3$ per liter of resin, or a total of 62.6 g $CrO_3$ for a volume of resin of 496 ml is rinsed downwardly with 1,200 ml demineralized water at a rate of 10 $^{-1}$.

A reduction elution of said column is then carried out counter-currently, that is to say, upwardly, by circulating over the resin at a rate of 5.3 $h^{-1}$, a neutral chromium sulphate solution obtained from a prior operation, to which is added sulphuric acid and $SO_2$ so that it has the following composition:

| | | |
|---|---|---|
| $Cr^{3+}$ expressed in $CrO_3$ | 178.5 | g/l |
| free $H_2SO_4$ | 6.1 | g/l |
| $SO_2$ | 12.8 | g/l |

The temperature of said solution at the inlet of the column is 20° C and, at the outlet, from 34° C at the start then 27° C at the end of elution. After 140 minutes, the volume of eluant solution used was 4,930 ml.

The volume of eluate obtained was 4,880 ml, the composition being as follows:

| | | |
|---|---|---|
| $Cr^{3+}$ expressed as $CrO_3$ | 175.5 | g/l |
| $SO_2$ | 0.74 | g/l |

Rinsing is then carried out in the column countercurrently using demineralized water at a temperature of 20° C at a flow rate of 2.7 $h^{-1}$ and recovering separately, at the column outlet, the volumes of solution by fractions of 0.5 l.

The recovery yield of chromium in the form of $Cr^{3+}$ was respectively 93.5% for a volume of 1 l used rinsing water, and 94.9% for a volume of 2 l of rinsing water.

It is obvious that a higher yield could be obtained by using a larger volume of rinsing water, but the $Cr^{3+}$ solution recovered would be too diluted for the operation to be economical.

During reuse in the following fixing operation of the column thus regenerated, the chromium which had remained fixed thereon is removed and passes into the final effluent solution, which is not a drawback the said chromium has a valency of 3+.

In the effluent from the second column disposed in series with the first, a $Cr^{6+}$ content lower than 1 ml/l was found.

EXAMPLE 3

Extraction of hexavalent chromium with an organic solvent

In a liquid-liquid extraction apparatus of the mixer-decanter type, comprising three stages, there is circulated countercurrently, on the one hand a hexavalent chromium solution containing 3.9 g/l of chromium and having an acidity of 0.277 N and, on the other hand, a solvent consisting of a solution in xylene of a branched chain dilarylamine of m.w. 384 (LA2 of Rohm & Haas) at a concentration of 0.1 mol/liter. The flow rates of the two phases are respectively 1.98 liter/hour for the aqueous phase and 1.62 liter/hour for the solvent. The exhausted solution discharged from the last extraction stage containing less than 0.1 mg chromium per liter, thus providing a chromium recovery rate higher than 99.9%.

In a 35 mm diameter glass tube provided with a stirrer rotating at 700 revolutions per minute, 340 $cm^3$ of the organic solution obtained in the above operation is stirred vigorously with 16 $cm^3$ of water. A stream of $SO_2$ gas is passed into the mixture at a flow rate of 0.10 liter/hour, stirring continuously. After 10 minutes stirring, the amount of $SO_2$ flowed being 1.05 liter, the solvent suddenly changes colour. Both the $SO_2$ flow and stirring are stopped to allow the two phases to separate by decantation. The temperature is raised to about 45° C.

On the one hand, a colorless Cr-free organic phase is recovered and, on the other, a green-colored aqueous phase consisting of a chromium sulphate solution having a concentration of 96 g/l of Cr and free of $Cr^{6+}$.

What is claimed is:

1. In a process for preparing a chromium sulphate from residual solutions containing hexavalent chromium compounds comprising contacting a residual solution containing hexavalent chromium compounds at a pH in the range of 0 to 6 with an anionic exchange resin whereby hexavalent chromium is fixed on said anionic exchange resin, eluting said anionic exchange resin containing fixed hexavalent chromium by contacting with an aqueous elution solution containing a reducing agent, and recovering an aqueous solution containing a chromium sulphate, the improvement consisting of utilizing an aqueous solution of sulphur dioxide in the presence of sulphuric acid as said aqueous elution solution.

2. The process of claim 1 wherein said aqueous elution solution is recirculated for further elution after cooling and addition of sulphur dioxide.

3. The process of claim 1 wherein said aqueous elution solution of sulphur dioxide in the presence of sulphuric acid contains from 2 to 20 g/l of sulphuric acid and an amount of sulphur dioxide corresponding to a molar range $SO_2:H_2SO_4$ of from 3.06 to 3.45:1.

4. The process of claim 1 wherein said anionic exchange resin is in the sulphate form prior said contacting step and subsequent to said eluting step.

5. A process for preparing a chromium sulphate from residual solutions containing hexavalent chromium compounds comprising contacting an aqueous acidic residual solution containing hexavalent chromium compounds with a water-insoluble organic solvent capable of dissolving hexavalent chromium compounds and resisting oxidation in a strongly acid medium, separating said organic solvent containing hexavalent chromium compounds dissolved therein from the aqueous acidic residual solution depleted in hexavalent chromium compounds, extracting said organic solvent containing hexavalent chromium compounds by contacting with an aqueous extraction solution of sulphur dioxide in the presence of sulphuric acid, separating the exhausted organic solvent for recycling, and recovering an aqueous solution containing a chromium sulphate.

6. The process of claim 5 wherein said sulphuric acid in said aqueous extraction solution is formed in situ during said extracting step by oxidation of said sulphur dioxide.

* * * * *

UNITED STATES PATENT OFFICE
CERTIFICATE OF CORRECTION

Patent No. 3,856,916            Dated  Dec. 24, 1974

Inventor(s) ROBERT LEFRANCOIS, JACQUES DENOYERS and MICHEL GABRIEL

It is certified that error appears in the above-identified patent and that said Letters Patent are hereby corrected as shown below:

On cover sheet;   "Paris" should be --Paris, France--

Inventor: "Michel Gabriel

"Casablanca, France" should be

--Casablanca, Morocco--

Left Off --Foreign Application Priority

April 14, 1972, France 72-13317--

| Col. | Line | |
|------|------|---|
| 5 | 1 | "2 to 15" should be --2 to 15%-- |
| 5 | 6 | "After saturation and each regeneration" should be |
| | | --After each saturation and regeneration-- |
| 10 | 20 | "1 ml/l" should be --1 mg/l-- |

Signed and Sealed this

Third Day of August 1976

[SEAL]

Attest:

RUTH C. MASON
Attesting Officer

C. MARSHALL DANN
Commissioner of Patents and Trademarks